UNITED STATES PATENT OFFICE.

JOSEPH FRANCIS KING, OF PHILADELPHIA, PENNSYLVANIA, ASSIGNOR OF ONE-HALF TO HARRY B. HAINES, OF PHILADELPHIA, PENNSYLVANIA.

BLEACHING COMPOSITION.

1,321,643.        Specification of Letters Patent.        Patented Nov. 11, 1919.

No Drawing.      Application filed June 28, 1919. Serial No. 307,265.

*To all whom it may concern:*

Be it known that I, JOSEPH FRANCIS KING, a citizen of the United States, and a resident of the city of Philadelphia, county of Philadelphia, State of Pennsylvania, have invented certain new and useful Improvements in Bleaching Compositions, of which the following is a specification.

My invention relates to a bleaching composition or compound for use in the process of bleaching materials such as cotton, linen and other plant fibers, textile goods and similar materials, as well as wool, silk and other animal fibers.

I have discovered that a new and useful composition suitable for use as a bleaching agent may be composed from common salt or sodium chlorid, soda ash or sodium carbonate, hydrogen peroxid, caustic soda or potassium hydrate and Glauber salt or sodium sulfate.

In carrying out my invention I prefer to mix together the following ingredients in substantially the proportions as follows:

10 parts by weight of common salt or sodium chlorid, 10 parts by weight of soda ash or sodium carbonate, 10 parts by weight of caustic potash or potassium hydrate, 6 parts by weight of hydrogen peroxid, 24 parts by weight of Glauber salt or sodium sulfate.

In this composition are included certain substances or agents used as a detergent for freeing the materials to be bleached of impurities, such as specks, motes, shives and similar matter, but these ingredients, namely, the caustic potash and the soda ash, may be omitted when desired.

For treating 1000 pounds of goods or materials to be bleached, I may take 60 pounds of the above-mentioned bleaching composition or mixture and dissolve the same in 500 gallons of water in a vat. I then place the goods or materials to be bleached in this solution and boil the contents of the vat for an hour, after which I rinse the bleached goods or material first with hot water for about five minutes and then with cold water for about five minutes.

While I have described one mode of compounding and a way of using my bleaching composition, such description is intended as exemplifying, rather than limiting, my invention and it is, therefore, understood that the materials, their proportions, the order in which they are composed and the period of treatment may be suitably varied without departing from the spirit and scope of my invention.

Having thus described my invention, I claim and desire to protect by Letters Patent of the United States:

1. In a composition for use as a bleaching agent, the combination of sodium chlorid, potassium hydrate, sodium carbonate, hydrogen peroxid and sodium sulfate.

2. In a composition for use as a bleaching agent, the combination of sodium chlorid, hydrogen peroxid and sodium sulfate.

3. In a composition for use as a bleaching agent, the combination of 10 parts by weight of sodium chlorid, 10 parts by weight of potassium hydrate, 10 parts by weight of sodium carbonate, 6 parts by weight of hydrogen peroxid and 24 parts by weight of sodium sulfate.

4. In a composition for use as a bleaching agent, the combination of equal portions of sodium chlorid, potassium hydrate and sodium carbonate, a smaller portion of hydrogen peroxid and a larger portion of sodium sulfate.

5. In a composition for use as a bleaching agent, the combination of sodium chlorid, an alkali, a carbonate of soda, a peroxid and sodium sulfate.

In witness whereof, I have hereunto set my hand this 27th day of June, 1919.

JOSEPH FRANCIS KING.